(12) United States Patent
Ishii

(10) Patent No.: US 10,178,040 B2
(45) Date of Patent: Jan. 8, 2019

(54) DATA PROCESSING DEVICE, RECEIVING DEVICE, DATA PROCESSING METHOD, AND PROGRAM

(71) Applicant: Sony Semiconductor Solutions Corporation, Kanagawa (JP)

(72) Inventor: Michito Ishii, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 76 days.

(21) Appl. No.: 15/321,058

(22) PCT Filed: Jun. 23, 2015

(86) PCT No.: PCT/JP2015/067978
§ 371 (c)(1),
(2) Date: Dec. 21, 2016

(87) PCT Pub. No.: WO2016/002573
PCT Pub. Date: Jan. 7, 2016

(65) Prior Publication Data
US 2017/0201463 A1 Jul. 13, 2017

(30) Foreign Application Priority Data

Jul. 3, 2014 (JP) .................................. 2014-137435

(51) Int. Cl.
*H04L 12/875* (2013.01)
*H04N 21/434* (2011.01)
(Continued)

(52) U.S. Cl.
CPC ............ *H04L 47/562* (2013.01); *H04L 47/23* (2013.01); *H04L 47/6245* (2013.01);
(Continued)

(58) Field of Classification Search
CPC ... H04L 47/562; H04L 47/23; H04L 47/6245; H04L 69/22; H04W 28/044; H04W 74/085
See application file for complete search history.

(56) References Cited

U.S. PATENT DOCUMENTS

| 5,953,489 | A | * | 9/1999 | Park | ....................... | H04N 5/926 |
| | | | | | | 386/241 |
| 6,747,998 | B1 | * | 6/2004 | Enari | ................. | H04N 21/2365 |
| | | | | | | 370/503 |

(Continued)

FOREIGN PATENT DOCUMENTS

| JP | 2012-060311 A | 3/2012 |
| JP | 2012-249086 A | 12/2012 |

(Continued)

*Primary Examiner* — Chi H Pham
*Assistant Examiner* — Weibin Huang
(74) *Attorney, Agent, or Firm* — Michael Best & Friedrich LLP

(57) ABSTRACT

The present disclosure relates to a data processing device, a receiving device, a data processing method, and a program capable of suppressing degradation in quality in a case of reproducing data. In one example, a packet selection units selects one service stream from a multiplexed stream obtained by multiplexing a plurality of service streams. An insertion unit inserts null packets with time information, in which predetermined time information has been given to payloads, to spaces that become empty when the packet selection unit generates the one service stream. Thereafter, in the streams which have been demultiplexed after being multiplexed, the timing to output the null packets is adjusted with reference to the time information inserted in-to the null packets.

11 Claims, 8 Drawing Sheets

(51) Int. Cl.
  *H04N 21/4385* (2011.01)
  *H04L 12/815* (2013.01)
  *H04L 12/863* (2013.01)
  *H04L 29/06* (2006.01)
  *H04W 74/08* (2009.01)

(52) U.S. Cl.
  CPC ............ *H04L 69/22* (2013.01); *H04N 21/434* (2013.01); *H04N 21/4385* (2013.01); *H04W 74/085* (2013.01)

(56) References Cited

U.S. PATENT DOCUMENTS

| | | | |
|---|---|---|---|
| 7,593,433 B1* | 9/2009 | Wu | H04J 14/0227 370/537 |
| 8,483,230 B1* | 7/2013 | Zhang | H04N 21/23406 370/395.64 |
| 2002/0168174 A1* | 11/2002 | Ito | G11B 27/034 386/248 |
| 2005/0047341 A1* | 3/2005 | Kim | H04N 21/23611 370/232 |
| 2007/0074256 A1* | 3/2007 | Jung | H04N 7/17354 725/100 |
| 2011/0164177 A1* | 7/2011 | Raveendran | H04N 21/4344 348/470 |
| 2013/0343468 A1* | 12/2013 | Ko | H04H 20/42 375/240.25 |
| 2015/0003544 A1* | 1/2015 | Ouchi | H04L 1/0041 375/260 |

FOREIGN PATENT DOCUMENTS

| | | |
|---|---|---|
| JP | 2013-098721 A | 5/2013 |
| JP | 2014-007476 A | 1/2014 |
| WO | 2011/024437 A1 | 3/2011 |

\* cited by examiner

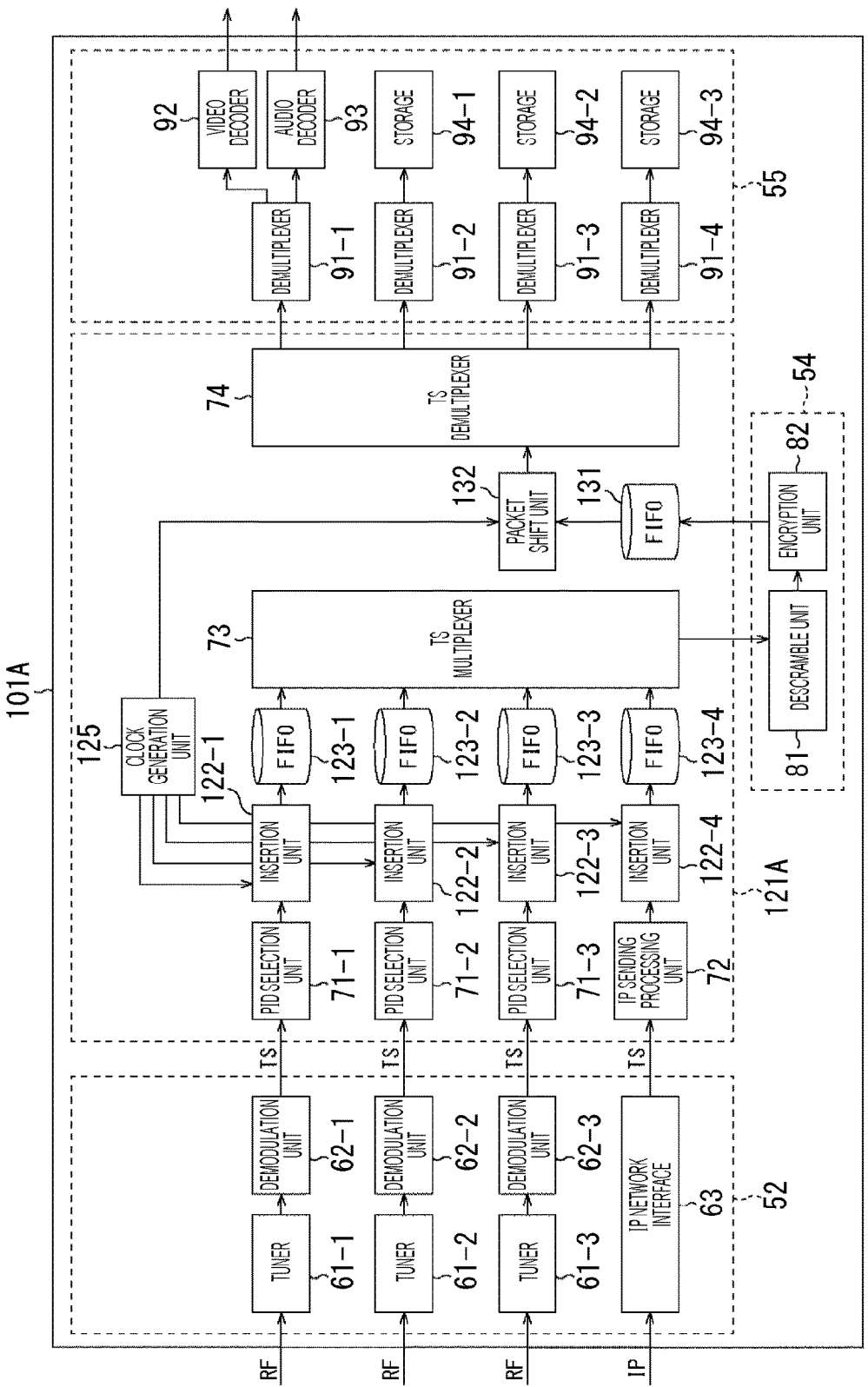

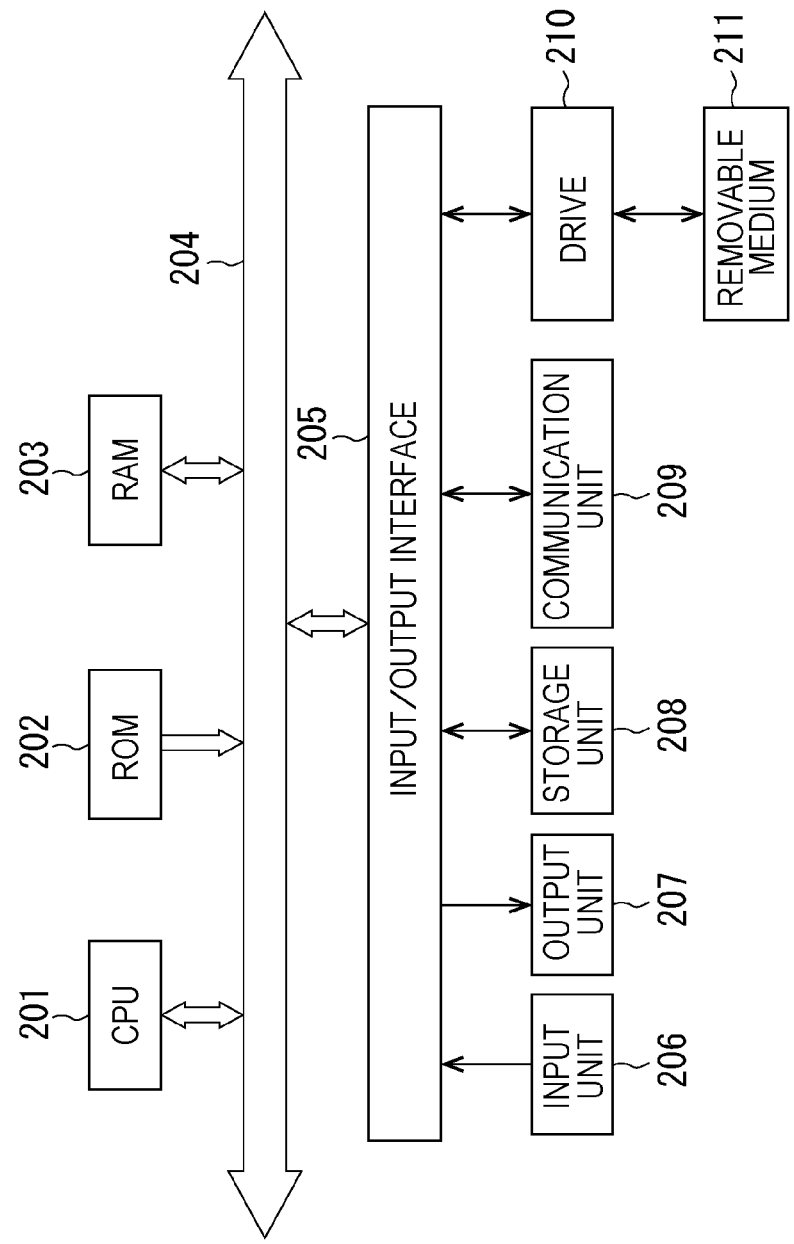

DATA PROCESSING DEVICE, RECEIVING DEVICE, DATA PROCESSING METHOD, AND PROGRAM

TECHNICAL FIELD

The present disclosure relates to a data processing device, a receiving device, a data processing method, and a program. The present disclosure particularly relates to a data processing device, a receiving device, a data processing method, and a program capable of suppressing degradation in quality in a case of reproducing data.

BACKGROUND ART

In digital television broadcasting in Europe, a common interface (CI) is being conventionally used in order to achieve a system (conditional access system (CAS)) that exclusively receives scrambled broadcasting. A plurality of streams has become handleable with the common interface (version 1.4), and a CI module is supplied with one multiplexed transport stream (TS) obtained by multiplexing a plurality of TSs.

For example, Patent Document 1 discloses a digital broadcasting receiving system capable of transmitting/receiving one composite stream finely to/from external devices. The composite stream is obtained by combining a plurality of streams.

Incidentally, the receiving device that receives a plurality of streams includes a first in first out (FIFO) unit in order to avoid collision that may occur in a case of multiplexing a plurality of TSs into one multiplexed TS. In addition, in order to suppress the bit rate of a multiplexed TS, the receiving device converts unnecessary packets, included in the TSs to be multiplexed, into null packets. The receiving device replaces the null packets with valid packets included in other TSs.

Here, in order to suppress the overall bit rate of the multiplexed TS, regular null packets are discarded. Therefore, the original number of the null packets is not ensured. As a result, the arrival time of the packets arriving at a latter decoding unit may be quickened, or delayed because a larger number of packets of other TSs are inserted than the number of the actual null packets that have existed.

CITATION LIST

Patent Document

Patent Document 1: Japanese Patent Application Laid-Open No. 2014-7476

SUMMARY OF THE INVENTION

Problems to be Solved by the Invention

As mentioned above, in a case where the arrival time of the packets arriving at the latter decoding unit is not ensured, decoding will be performed in a state of the time axis being failed, in decoding video and audio on the basis of a system time clock (STC) that is generated using a program clock reference (PCR) value. The PCR value works on the assumption that packets arrive at constant time intervals. Therefore, conventionally, qualities of video and audio may degrade, for example, in a case where skip, repeat and the like are operated in reproduction.

The present disclosure has been made in view of the above situations, and can suppress degradation in quality when data is reproduced.

Solutions to Problems

A data processing device according to one aspect of the present disclosure includes: a predetermined number of packet selection units that generate one service stream by selecting packets configuring each service stream from a multiplexed stream obtained by multiplexing a plurality of service streams; a predetermined number of insertion units that insert null packets with time information, in which predetermined time information has been given to payloads, to spaces which have become empty when a predetermined number of the packet selection units generate the one service stream; a multiplexer that multiplexes a predetermined number of streams in which the null packets with time information have been inserted by a predetermined number of the insertion units; a demultiplexer that demultiplexes the stream multiplexed by the multiplexer into a predetermined number of streams; and an output timing adjusting unit that adjusts timing to output the null packets with time information with reference to the time information given to the null packets with time information.

A receiving device according to one aspect of the present disclosure includes: a demodulation unit that demodulates broadcasting waves, and acquires a multiplexed stream; a predetermined number of packet selection units that generate one service stream by selecting packets configuring each service stream from the multiplexed stream obtained by multiplexing a plurality of service streams; a predetermined number of insertion units that insert null packets with time information, in which predetermined time information has been given to payloads, to spaces which have become empty when a predetermined number of the packet selection units generate the one service stream; a multiplexer that multiplexes streams in which the null packets with time information have been inserted by a predetermined number of the insertion units; a demultiplexer that demultiplexes the stream multiplexed by the multiplexer into a predetermined number of streams; an output timing adjusting unit that adjusts timing to output the null packets with time information with reference to the time information given to the null packets with time information; and a decoding unit that decodes video and audio included in the stream output from the output timing adjusting unit.

A data processing method or a program according to one aspect of the present disclosure includes the steps of: generating one service stream by selecting packets configuring each service stream from a multiplexed stream obtained by multiplexing a plurality of service streams; inserting null packets with time information, in which predetermined time information has been given to payloads, to spaces which have become empty when the one service stream is generated; multiplexing a predetermined number of streams in which the null packets with time information have been inserted; demultiplexing the multiplexed stream into a predetermined number of streams; and adjusting timing to output the null packets with time information with reference to the time information given to the null packets with time information.

In one aspect of the present disclosure, one service stream is generated by selecting packets configuring each service stream from a multiplexed stream obtained by multiplexing a plurality of service streams, null packets with time information, in which predetermined time information has been given to payloads, are inserted to spaces that have become empty when the one service stream is generated, a predetermined number of streams in which the null packets with time information have been inserted are multiplexed, the multiplexed stream is demultiplexed into a predetermined number of streams, and timing to output the null packets with time information is adjusted with reference to the time information given to the null packets with time information.

Effects of the Invention

According to one aspect of the present disclosure, degradation in quality can be suppressed in a case of reproducing data.

BRIEF DESCRIPTION OF DRAWINGS

FIG. 7 is a block diagram showing an exemplary configuration of a second embodiment of a receiving device.

FIG. 8 is a block diagram showing an exemplary configuration of one embodiment of a computer to which the present technology is applied.

MODE FOR CARRYING OUT THE INVENTION

Hereinafter, specific embodiments to which the present technology is applied will be described in detail with reference to the drawings.

First, conventional receiving devices will be described with reference to FIGS. 1 to 3.

Figure 1:
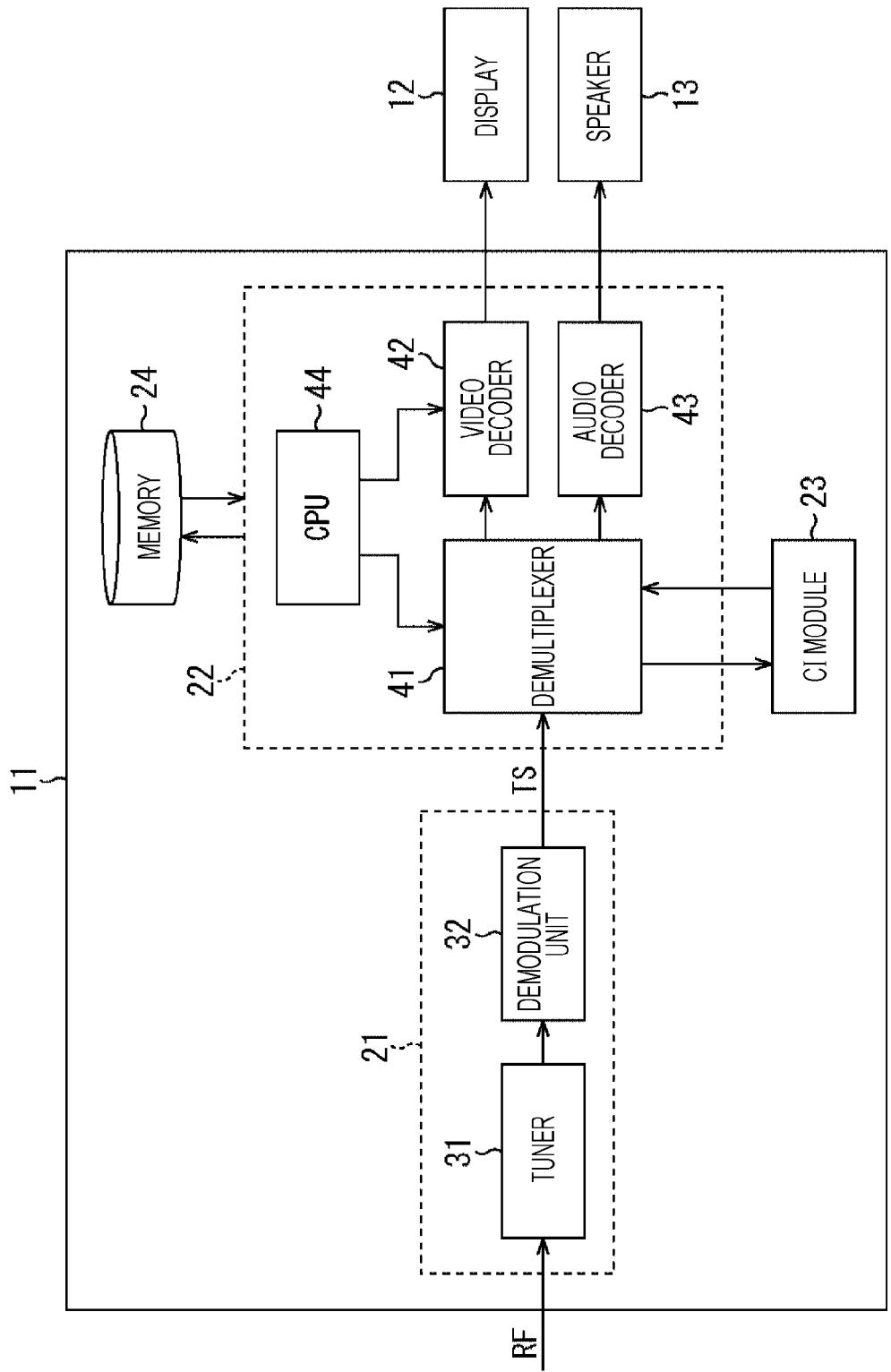
FIG. 1 is a block diagram showing an exemplary configuration of a conventional receiving device that receives one stream.

FIG. 1 is a block diagram showing an exemplary configuration of a conventional receiving device that receives one stream.

A display 12 and a speaker 13, as well as an antenna that is not shown, are connected to a receiving device 11. Also, the receiving device 11 displays video on the display 12 and outputs audio from the speaker 13 on the basis of broadcasting waves received by the antenna.

As shown in FIG. 1, the receiving device 11 includes a demodulation LSI 21, a decode LSI 22, a CI module 23, and a memory 24.

The demodulation LSI 21 includes a tuner 31 and a demodulation unit 32. The antenna supplies radio frequency (RF) signals to the tuner 31 by receiving broadcasting waves and a frequency of the signals is converted by the tuner 31. The demodulation LSI 21 supplies, to the decode LSI 22, a TS acquired by demodulating the signals by the demodulation unit 32.

The decode LSI 22 includes a demultiplexer 41, a video decoder 42, an audio decoder 43, and a CPU 44. The demultiplexer 41, the video decoder 42, and the audio decoder 43 perform processing in accordance with control by the CPU 44. For example, the demultiplexer 41 supplies, to the CI module 23, a TS that has come from the demodulation LSI 21. After that, the demultiplexer 41 demultiplexes the TS that has been returned from the CI module 23 to a video elementary stream (ES) and an audio ES in accordance with packet IDs (PID). Thereafter, the demultiplexer 41 supplies the video ES and the audio ES respectively to the video decoder 42 and the audio decoder 43. Thereafter, the video decoder 42 decodes the video ES to a baseband, and outputs the same to the display 12. The audio decoder 43 decodes the audio ES to a baseband, and outputs the same to the speaker 13.

The CI module 23 exchanges keys, for example, with respect to a scrambled TS supplied from the demultiplexer 41. After that, the CI module 23 descrambles the TS and returns the same to the demultiplexer 41.

The memory 24 properly stores data needed for the decode LSI 22 to perform processing.

The receiving device 11 configured as above can receive one stream, and display video and output audio included in the stream.

Figure 2:
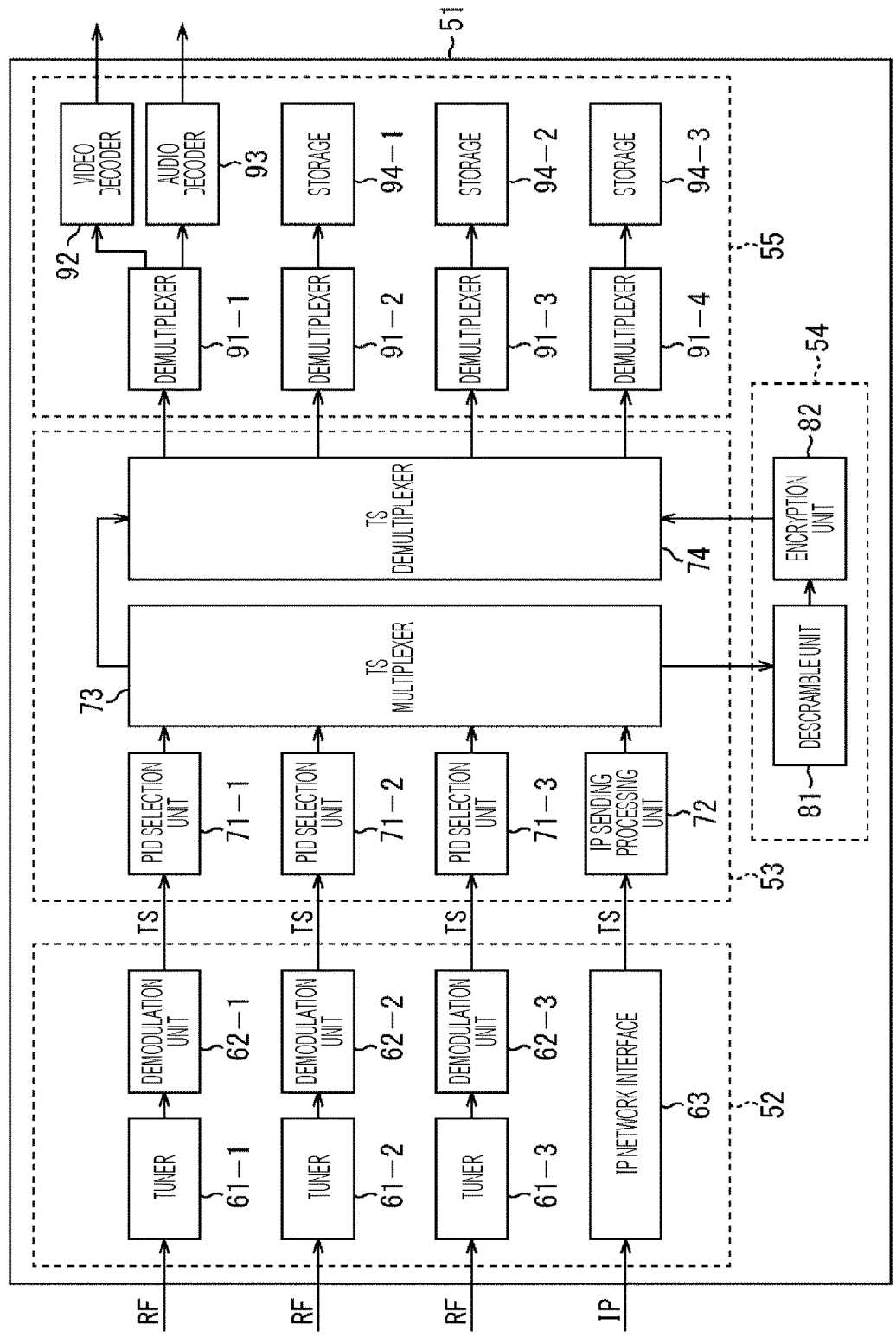
FIG. 2 is a block diagram showing an exemplary configuration of a conventional receiving device that receives a plurality of streams.

FIG. 2 is a block diagram showing an exemplary configuration of a conventional receiving device that receives a plurality of streams.

In the exemplary configuration in FIG. 2, a receiving device 51 is configured to receive four streams including three streams of RF signals and one stream of IP signals. For example, one stream of internet protocol (IP) signals delivered via a network such as the Internet, as well as three streams of RF signals received by an antenna that is not shown, is supplied to the receiving device 51. Also, the receiving device 51 displays video on a display that is not shown and outputs audio from a speaker that is not shown.

As shown in FIG. 2, the receiving device 51 includes a front-end unit 52, a multistream processor 53, a CI module 54, and a decode unit 55.

The front-end unit 52 includes three tuners 61-1 to 61-3, three demodulation units 62-1 to 62-3, and an IP network interface 63.

The tuners 61-1 to 61-3 convert frequencies of the RF signals supplied to the respective tuners to obtain IF signals. The tuners 61-1 to 61-3 supply the obtained IF signals to the demodulation units 62-1 to 62-3, respectively.

The demodulation units 62-1 to 62-3 obtain TSs by demodulating the IF signals supplied to the respective demodulation units, and then supply the TSs to the decode unit 55.

The IP network interface 63 is connected to a network such as the Internet. The IP network interface 63 obtains a TS from IP signals delivered via the network and supplies the TS to the decode unit 55.

The multistream processor 53 includes three PID selection units 71-1 to 71-3, an IP sending processing unit 72, a TS multiplexer 73, and a TS demultiplexer 74.

The PID selection units 71-1 to 71-3 select only packets that configure corresponding streams (services), in accordance with PIDs included in the TSs supplied respectively from the demodulation units 62-1 to 62-3. Thereafter, the PID selection units 71-1 to 71-3 convert unnecessary packets into null packets to provide empty spaces. As a result, the PID selection units 71-1 to 71-3 generate partial TSs that are reconfigured only from packets that configure streams that the respective units desire. Then, the PID selection units 71-1 to 71-3 supply the partial TSs to the TS multiplexer 73.

The IP sending processing unit 72 generates a partial TS from the TS that has been supplied from the IP network interface 63 similar to the PID selection units 71-1 to 71-3. Then, the IP sending processing unit 72 supplies the partial TS to the TS multiplexer 73.

Here, each of the TSs has a bit rate of 96 Mbps at most, and the CI module 54 can only accept processing of 96 Mbps at most. Therefore, the bit rate needs to be lowered when the four streams are multiplexed. The bit rate can be lowered by the PID selection units 71-1 to 71-3 and the IP sending processing unit 72 generating partial TSs in which only necessary packets are selected. In the partial TSs, only packets with some major sections, video ESs, and audio ESs are selected and the rest is replaced with null packets.

The TS multiplexer 73 multiplexes the four partial TSs supplied from the PID selection units 71-1 to 71-3 and the IP sending processing unit 72 to generate one multiplexed TS, and then supplies the one multiplexed TS to the CI module 54. For example, the TS multiplexer 73 takes out and arranges all the four TSs with the same priority as in a round robin manner, and multiplexes the TSs.

The TS demultiplexer 74 demultiplexes the multiplexed TS, which has been scrambled and further locally encrypted in the CI module 54, to the original four partial TSs, and then supplies the original four partial TSs to the decode unit 55.

The CI module 54 includes a descramble unit 81 and an encryption unit 82.

The descramble unit 81 descrambles the scrambled multiplexed TS supplied from the TS multiplexer 73 and supplies the descrambled multiplexed TS to the encryption unit 82.

The encryption unit 82 locally encrypts (for example, conducting content control encryption) the multiplexed TS supplied from the descramble unit 81, and returns the multiplexed TS to the TS demultiplexer 74.

The decode unit 55 includes four demultiplexers 91-1 to 91-4, a video decoder 92, an audio decoder 93, and three storages 94-1 to 94-3.

The four partial TSs that have been demultiplexed at the TS demultiplexer 74 are respectively supplied to the demultiplexers 91-1 to 91-4. Thereafter, the demultiplexers 91-1 to 91-4 output video ESs, audio ESs and the like that have been demultiplexed from the respective partial TSs. For example, a partial TS to be reproduced is supplied to the demultiplexer 91-1. The demultiplexer 91-1 supplies a video ES to the video decoder 92 and an audio ES to the audio decoder 93, the video and audio ESs being demultiplexed from the partial TS.

The video decoder 92 decodes a video ES supplied from the demultiplexer 91-1 and supplies the video ES to a display that is not shown, and then displays the video.

The audio decoder 93 decodes an audio ES supplied from the demultiplexer 91-1 and supplies the audio ES to a speaker that is not shown, and then outputs the audio.

Video ESs and audio ESs of respective partial TSs demultiplexed by the demultiplexers 91-2 to 91-4 are supplied to the storages 94-1 to 94-3. Then the video ESs and the audio ESs are stored in the storages 94-1 to 94-3.

The receiving device 51 configured as above can display video and output audio included in the stream to be reproduced, and can store video and audio included in other streams by receiving a plurality of streams.

An arrangement of packets to be processed by the receiving device 51 will be described with reference to FIG. 3.

Figure 3:
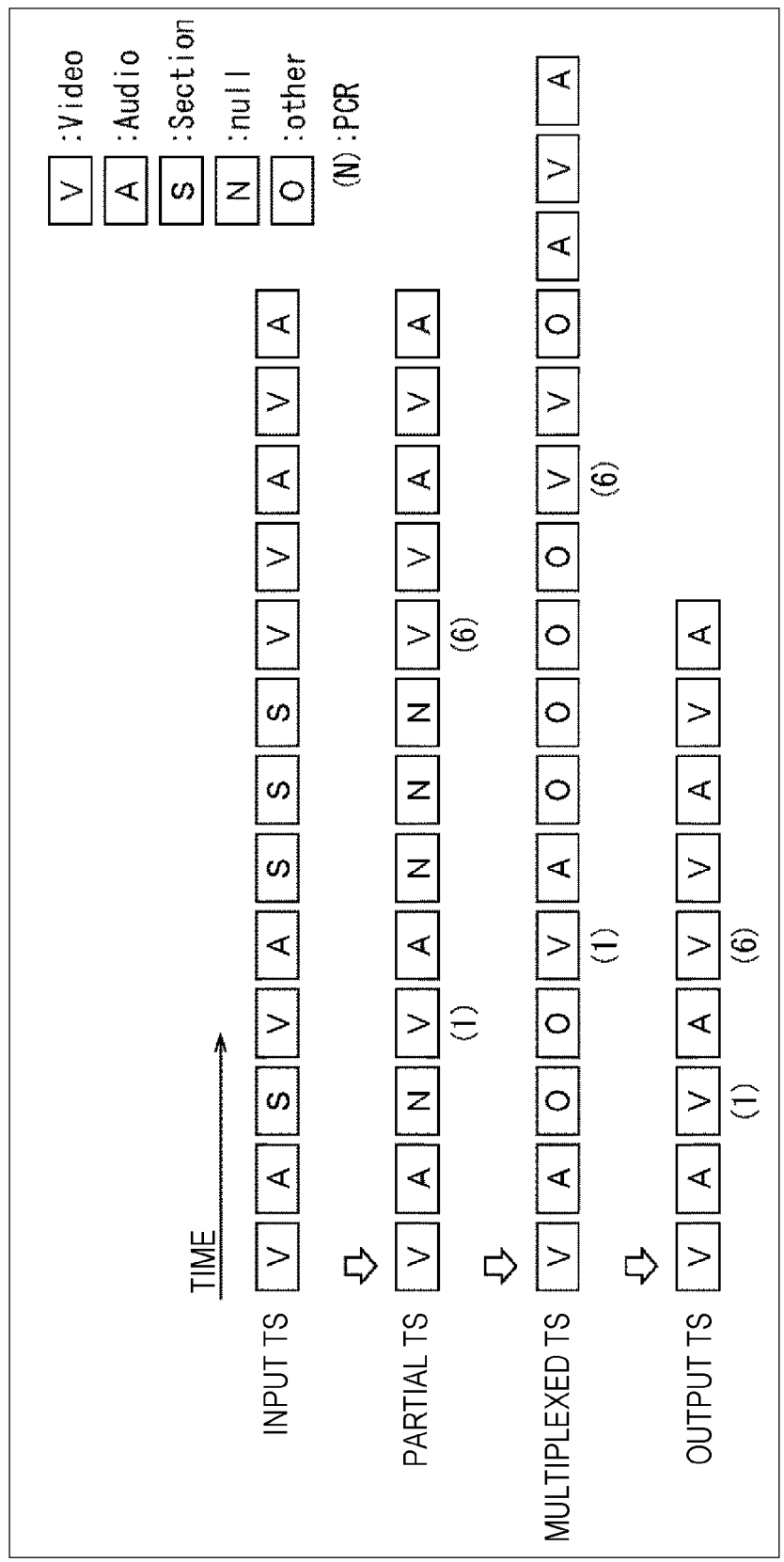
FIG. 3 is a diagram describing arrangement of packets in conventional processing.

In FIG. 3, one TS supplied to one PID selection unit 71 is shown. The time direction of input or output of packets is indicated from the right side to the left side. TSs obtained in each processing performed in order are indicated from the top side to the bottom side.

For example, in an input TS input to the PID selection unit 71, packets V including video ESs, packets A including audio ESs, and sections S including various kinds of metadata are arranged in a predetermined order. A partial TS is generated by, for example, the PID selection unit 71 selecting only the packets V and the packets A from the input TS, and replacing packets having unnecessary PIDs with null packets N in the input TS. Here, (1) and (6) shown below two packets V indicate PCR.

Thereafter, a multiplexed TS is generated by the partial TSs being multiplexed at the TS multiplexer 73. Packets O configuring other streams are inserted into positions where null packets N of a partial TS have been arranged, the partial TS being output from this PID selection unit 71. After that, the multiplexed TS is demultiplexed by the TS demultiplexer 74 and output TSs are output from the multistream processor 53.

Here, in the output TS, the null packets N included in the partial TS have been discarded. Therefore, as shown in the diagram, the interval between the packet V with PCR (1) and the packet V with PCR (6) is different from the partial TS so that the time axis is being failed. The quality of video will degrade if the output TS is decoded in this state.

To be specific, in the example of FIG. 3, the output TS does not have the null packets that have existed in the partial TS before being multiplexed, and the time information in the output TS is in a state of being moved ahead. Therefore, the output TS in this state will be reproduced with the clock being put forward. Therefore, the buffer model fails, and skips due to delay in decoding or repeats due to error concealment occur and appear on video. Also, silence occurs frequently in audio.

Hereupon, degradation in quality needs to be suppressed in a case of reproducing video and audio by avoiding such failure in the time axis.

Figure 4:
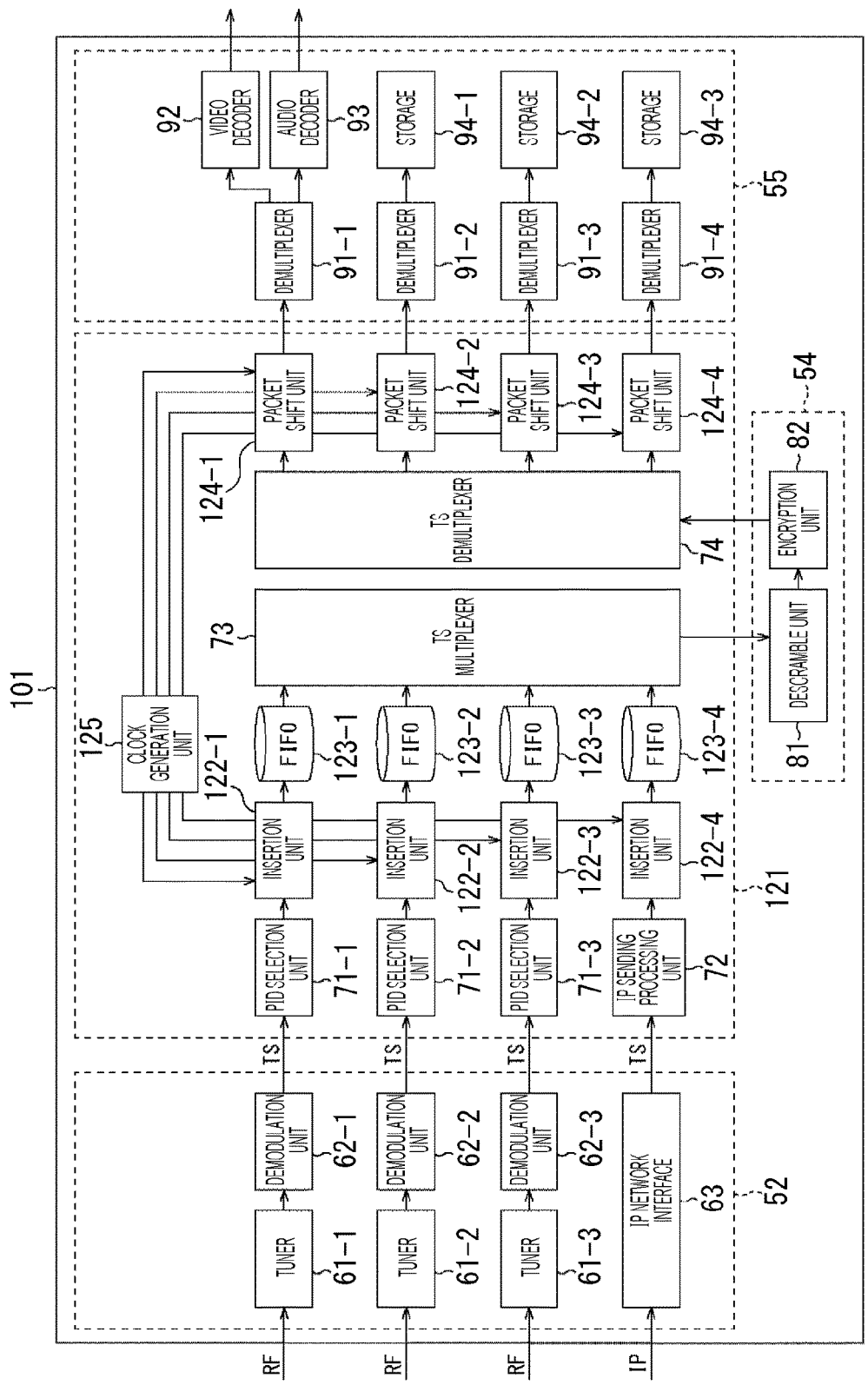
FIG. 4 is a block diagram showing an exemplary configuration of a first embodiment of a receiving device to which the present technology is applied.

Next, FIG. 4 is a block diagram showing an exemplary configuration of a first embodiment of a receiving device 101 to which the present technology is applied.

The receiving device 101 shown in FIG. 4 has the same reference signs for common configurations with the receiving device 51 in FIG. 2, and the detailed descriptions thereof are omitted. To be specific, the receiving device 101 has a common configuration with the receiving device 51 in FIG. 2, in that the receiving device 101 includes the front-end unit 52, the CI module 54, and the decode unit 55. However, the receiving device 101 has a different configuration from the receiving device 51 in FIG. 2, in that the receiving device 101 includes a multistream processor 121 with a different configuration from the multistream processor 53 in the receiving device 51 in FIG. 2.

The multistream processor 121, similar to the multistream processor 53 in the receiving device 51 in FIG. 2, includes the three PID selection units 71-1 to 71-3, the IP sending processing unit 72, the TS multiplexer 73, and the TS demultiplexer 74. In addition, the multistream processor 121 includes four insertion units 122-1 to 122-4, four FIFOs 123-1 to 123-4, four packet shift units 124-1 to 124-4, and a clock generation unit 125.

The insertion units 122-1 to 122-4 insert null packets, to which time information has been added according to a clock generated by the clock generation unit 125 (hereinafter referred to as null packets with time information), into partial TSs supplied from the PID selection units 71-1 to 71-3 and the IP sending processing unit 72. For example, the insertion units 122-1 to 122-4 detect packets including PCR included in partial TSs, trace back the time axis from the detected packets, and give time information to the payload sections of the nearest null packets. In this manner, the null packets are replaced with null packets with time information.

The FIFOs 123-1 to 123-4 temporarily store necessary packets selected by the PID selection units 71-1 to 71-3 and the IP sending processing unit 72, and null packets with time information inserted by the insertion units 122-1 to 122-4. Thereafter, the packets stored in the FIFOs 123-1 to 123-4 are sequentially read to the TS multiplexer 73 for each TS sequence.

The packet shift units 124-1 to 124-4 are provided after the TS demultiplexer 74, and partial TSs demultiplexed by the TS demultiplexer 74 are respectively supplied to the packet shift units 124-1 to 124-4. Also, to the packet shift units 124-1 to 124-4, the time information generated at the clock generation unit 125 is supplied with an offset. Thereafter, the packet shift units 124-1 to 124-4 compare the time information from the clock generation unit 125 and the null packets with time information included in the partial TSs, and adjust the timing to output the null packets with time information. For example, the packet shift units 124-1 to 124-4 output the null packets with time information to the decode unit 55 at the same timing as the time information from the clock generation unit 125 or at the timing after the time information.

The clock generation unit 125 generates time information with a fixed clock and supplies the time information to the insertion units 122-1 to 122-4 and the packet shift units 124-1 to 124-4.

The receiving device 101 configured as above can properly reproduce arrival time of packets by inserting null packets with time information in accordance with a clock generated by the clock generation unit 125, and then adjusting the timing to output on the basis of the null packets with time information. Therefore, video and audio can be reproduced at proper time and the degradation in qualities thereof can be suppressed in reproduction of the video and the audio.

An arrangement of packets to be processed by the receiving device 101 will be described with reference to FIG. 5.

Figure 5:
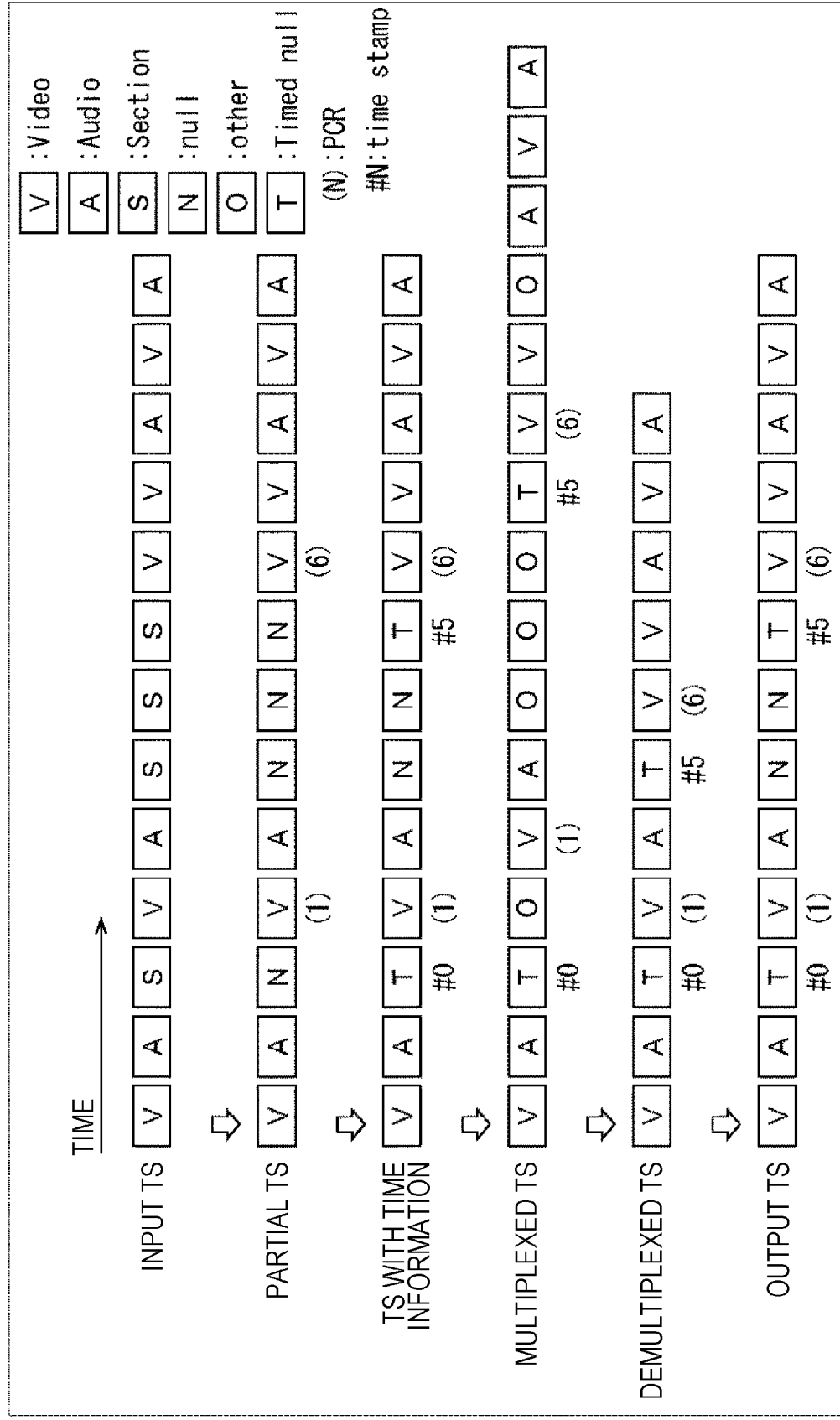
FIG. 5 is a diagram describing arrangement of packets to be processed by the receiving device.

In FIG. 5, similar to FIG. 3, video packets V, audio packets A, sections S, and null packets N are shown. Furthermore, null packets with time information T inserted by the insertion units 122-1 to 122-4 are shown.

An input TS similar to that in FIG. 3 is input to the PID selection unit 71. A partial TS generated by the PID selection unit 71 is supplied to the insertion unit 122. Thereafter, the insertion unit 122 inserts null packets with time information into spaces that have become empty by the null packets N being replaced when the partial TS is generated, and generates a TS with time information. Here, the insertion unit 122 inserts a null packet with time information T by giving time information with a time stamp #0 to the payload section of a null packet N immediately before the packet V with PCR (1). Also, the insertion unit 122 inserts a null packet with time information T by giving time information with a time stamp #5 to the payload section of a null packet N immediately before the packet V with PCR (6).

Thereafter, a multiplexed TS is generated by the TS with time information being multiplexed at the TS multiplexer 73 and packets O configuring other streams being inserted. Thereafter, a demultiplexed TS obtained by demultiplexing the multiplexed TS by the TS demultiplexer 74 is supplied to the packet shift unit 124.

The packet shift units 124-1 to 124-4, for example, adjust the timing to output the null packet with time information T with a time stamp #5 in accordance with the time information generated at the clock generation unit 125, and inserts null packets N to delay the timing. By doing so, the arrival time of the null packet with time information T with the time stamp #5, before being multiplexed, can be assured when the same is output. Furthermore, there is no absence of packets subsequent to the null packet with time information T with the time stamp #5, and therefore, the arrival time information is assured.

Therefore, the arrival time information of packets having PCR are correct, and an STC generated by a clock recovery based on the PCR can restore time information on an export side.

Figure 6:
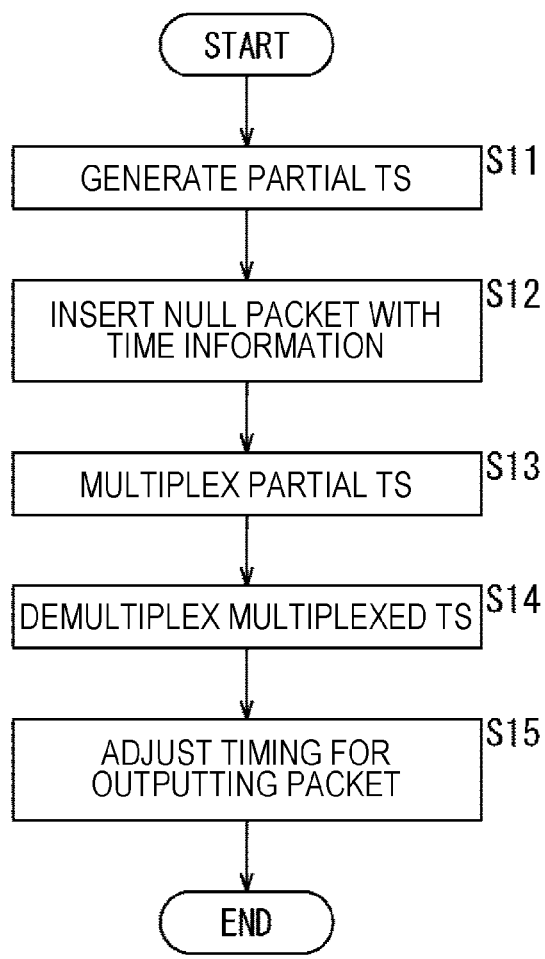
FIG. 6 is a flowchart describing data processing performed in a multistream processor.

Next, data processing performed in the multistream processor 121 will be described with reference to a flowchart shown in FIG. 6.

The processing starts, for example, once the receiving device 101 starts processing for receiving multiplexed streams, and packets configuring TSs demodulated at the front-end unit 52 are supplied to the multistream processor 121.

At step S11, the PID selection units 71-1 to 71-3 and an IP sending processing unit 72 generate partial TSs reconfigured by selecting only packets configuring service TSs corresponding to the respective units in accordance with PIDs included in the packets that have been supplied. Thereafter, the partial TSs are respectively supplied to the insertion units 122-1 to 122-4. In addition, in the partial TS, packets configuring TSs other than the services corresponding to each of the PID selection units 71-1 to 71-3 and the IP sending processing unit 72 are replaced with null packets.

At step S12, the insertion units 122-1 to 122-4 insert null packets with time information into the partial TSs respectively supplied to the insertion units 122-1 to 122-4 in accordance with a clock generated by the clock generation unit 125, and make the FIFOs 123-1 to 123-4 to store the null packets.

At step S13, the TS multiplexer 73 properly reads the packets stored in the FIFOs 123-1 to 123-4, multiplexes the four streams, and supplies the same to the CI module 54.

At step S14, the TS demultiplexer 74 demultiplexes the multiplexed stream supplied from the CI module 54 into four partial TSs, and respectively supplies the TSs to the packet shift units 124-1 to 124-4.

At step S15, the packet shift units 124-1 to 124-4 adjust the timing to output the null packets with time information in accordance with the time information supplied from the clock generation unit 125.

As mentioned above, the receiving device 101 can correctly reproduce arrival time of packets by using null packets with time information. Therefore, the degradation in quality of video and audio can be prevented when skip, repeat and the like of video and audio are operated. Note that with the receiving device 101, whether the time information has been added can be checked by probing the interface with the CI module 54.

Next, FIG. 7 is a block diagram showing an exemplary configuration of a second embodiment of a receiving device to which the present technology is applied.

A receiving device 101A shown in FIG. 7 has the same reference signs for common configurations with the receiving device 101 in FIG. 4, and the detailed descriptions thereof are omitted. To be specific, the receiving device 101A has a common configuration with the receiving device 101 in FIG. 4, in that the receiving device 101A includes the front-end unit 52, the CI module 54, and the decode unit 55. However, in the receiving device 101A, a multistream processor 121A has a different configuration from the multistream processor 121 in the receiving device 101 in FIG. 4.

The multistream processor 121A has a common configuration with the multistream processor 121 in FIG. 4, in that the multistream processor 121A includes the PID selection units 71-1 to 71-3, the IP sending processing unit 72, the TS multiplexer 73, the TS demultiplexer 74, the insertion units 122-1 to 122-4, the FIFOs 123-1 to 123-4, and the clock generation unit 125. However, the multistream processor 121A has a different configuration from the multistream processor 121 in FIG. 4, in that the multistream processor 121A includes a FIFO 131 and a packet shift unit 132.

To be specific, the multistream processor 121A supplies a multiplexed TS to the CI module 54. The multiplexed TS is obtained by multiplexing, at the TS multiplexer 73, TSs with time information into which null packets with time information have been inserted by the insertion units 122-1 to 122-4. Also, the multistream processor 121A is configured such that the multiplexed TS returned from the CI module 54 is supplied to the packet shift unit 132 after having been temporarily stored at the FIFO 131.

The packet shift unit 132 reads the multiplexed TS from the FIFO 131 and supplies the same to the TS demultiplexer 74. Here, similar to the packet shift units 124-1 to 124-4 in FIG. 4, the packet shift unit 132 adjusts the timing to output the null packets with time information in accordance with the time information supplied from the clock generation unit 125.

The receiving device 101A configured as above can assure arrival time at a step of inputting the multiplexed TS to the TS demultiplexer 74 by arranging only one packet shift unit 132 before the TS demultiplexer 74. In addition, by arranging the FIFO 131, the receiving device 101A can avoid the possibility of the arrival time being elapsed, which would occur with the original arrangement in a multiplexed TS obtained by multiplexing a plurality of TSs. In other words, intervals of the packets output to the TS demultiplexer 74 can be fixed by the packet shift unit 132 delaying the timing to read the packets from the FIFO 131 or immediately reading the packets.

Note that the receiving device 101 may, for example, replace a null packet with a null packet with time information, or replace a PID packet not in use with a null packet with time information. As described above, even when null packets with time information are inserted, the existing periods thereof are before being supplied to the demultiplexer 91. Therefore, the null packets with time information do not influence a PID filter as a system. Also, a PID not in use can be changed dynamically.

Note that each processing described with reference to the flowchart mentioned above does not necessarily have to be performed in chronological order as described in the flowchart. The processing can include processing performed in parallel or individually (for example, parallel processing or processing by object). Also, a program may be processed by a single CPU, or may be distributively processed by a plurality of CPUs.

Also, the series of processing (information processing method) mentioned above can be performed by hardware as well as software. In a case of performing the series of processing by software, the program configuring the software is installed on a computer, a general-purpose personal computer, or the like, from a program recording medium on which the program is stored. The computer is built into dedicated hardware. The general-purpose personal computer can perform various kinds of functions by installing various programs.

FIG. 8 is a block diagram showing an exemplary configuration of hardware of a computer that performs the series of processing mentioned above by a program.

In a computer, a central processing unit (CPU) 201, a read only memory (ROM) 202, and a random access memory (RAM) 203 are connected mutually via a bus 204.

An input/output interface 205 is further connected to the bus 204. An input unit 206 including a keyboard, a mouse, a microphone and the like, an output unit 207 including a display, a speaker and the like, a storage unit 208 including a hard disk, a non-volatile memory and the like, a communication unit 209 including a network interface and the like, and a drive 210 that drives a removable medium 211 such as a magnetic disk, an optical disk, a magneto-optic disk, or a semiconductor memory are connected to the input/output interface 205.

In the computer configured as above, the CPU 201, for example, loads a program stored in the storage unit 208 to the RAM 203 via the input/output interface 205 and the bus 204, and executes the program. Thus, the series of processing mentioned above is performed.

A program executed by the computer (CPU 201) is supplied by being recorded on, for example, the removable medium 211 as a packaged medium such as a magnetic disk (including a flexible disk), an optical disk (e.g., compact disc-read only memory (CD-ROM), a digital versatile disc (DVD)), an magneto-optic disk, and a semiconductor memory, or supplied via a wired or wireless transmission medium such as a local area network, the Internet, and digital satellite broadcasting.

Then, the program can be installed on the storage unit 208 via the input/output interface 205 by inserting the removable medium 211 into the drive 210. Alternatively, the program can be installed on the storage unit 208 by receiving the program at the communication unit 209 via a wired or wireless transmission medium. Apart from that, the program can be installed in advance on the ROM 202 or the storage unit 208.

Note that the present technology can also be configured as follows.

(1)

A data processing device including:

a predetermined number of packet selection units that generate one service stream by selecting packets configuring each service stream from a multiplexed stream obtained by multiplexing a plurality of service streams;

a predetermined number of insertion units that insert null packets with time information, in which predetermined time information has been given to payloads, to spaces which have become empty when a predetermined number of the packet selection units generate the one service stream;

a multiplexer that multiplexes a predetermined number of streams in which the null packets with time information have been inserted by a predetermined number of the insertion units;

a demultiplexer that demultiplexes the stream multiplexed by the multiplexer into a predetermined number of streams; and an output timing adjusting unit that adjusts timing to output the null packets with time information with reference to the time information given to the null packets with time information.

(2)

The data processing device according to (1), wherein a predetermined number of the output timing adjusting units are provided after the demultiplexer.

(3)

The data processing device according to (1), wherein only one output timing adjusting unit is provided before the demultiplexer.

(4)

The data processing device according to any of (1) to (3), wherein the insertion units detect packets having information on timing for reproduction included in the original stream, trace back the time axis from the detected packets, and insert the null packets with time information into the nearest empty spaces.

(5)

The data processing device according to any of (1) to (4), further comprising a clock generation unit that supplies time information generated with a fixed clock to the insertion units and the output timing adjusting unit.

(6)

A receiving device including:

a demodulation unit that demodulates broadcasting waves, and acquires a multiplexed stream;

a predetermined number of packet selection units that generate one service stream by selecting packets configuring each service stream from the multiplexed stream obtained by multiplexing a plurality of service streams;

a predetermined number of insertion units that insert null packets with time information, in which predetermined time information has been given to payloads, to spaces which have become empty when a predetermined number of the packet selection units generate the one service stream;

a multiplexer that multiplexes streams in which the null packets with time information have been inserted by a predetermined number of the insertion units;

a demultiplexer that demultiplexes the stream multiplexed by the multiplexer into a predetermined number of streams;

an output timing adjusting unit that adjusts timing to output the null packets with time information with reference to the time information given to the null packets with time information; and a decoding unit that decodes video and audio included in the stream output from the output timing adjusting unit.

(7)

A data processing method including the steps of:

generating one service stream by selecting packets configuring each service stream from a multiplexed stream obtained by multiplexing a plurality of service streams;

inserting null packets with time information, in which predetermined time information has been given to payloads, to spaces which have become empty when the one service stream is generated;

multiplexing a predetermined number of streams in which the null packets with time information have been inserted;

demultiplexing the multiplexed stream into a predetermined number of streams; and adjusting timing to output the null packets with time information with reference to the time information given to the null packets with time information.

(8)

A program that causes a computer to execute data processing including the steps of:

generating one service stream by selecting packets configuring each service stream from a multiplexed stream obtained by multiplexing a plurality of service streams;

inserting null packets with time information, in which predetermined time information has been given to payloads, to spaces which have become empty when the one service stream is generated;

multiplexing a predetermined number of streams in which the null packets with time information have been inserted;

demultiplexing the multiplexed stream into a predetermined number of streams; and adjusting timing to output the null packets with time information with reference to the time information given to the null packets with time information.

Note that the present embodiments are not limited to the embodiments mentioned above, and various modifications can be applied thereto as long as they do not depart from the gist of the present disclosure.

REFERENCE SIGNS LIST

52 Front-end unit
54 CI module
55 Decode unit
61 Tuner
62 Demodulation unit
63 IP network interface
71 PID selection unit
72 IP sending processing unit
73 TS multiplexer
74 TS demultiplexer
81 Descramble unit
82 Encryption unit
91 Demultiplexer
92 Video decoder
93 Audio decoder
92 Storage
101 Receiving device
121 Multistream processor
122 Insertion unit
123 FIFO
124 Packet shift unit
125 Clock generation unit
131 FIFO
132 Packet shift unit

The invention claimed is:

1. A data processing device comprising:

one or more packet selection units that generate one service stream of a plurality of service streams by selecting packets configuring the one service stream from a multiplexed stream obtained by multiplexing the plurality of service streams;

one or more insertion units that insert null packets with time information, in which predetermined time information has been given to payloads, to spaces that become empty when the one or more packet selection units generate the one service stream;

a multiplexer that multiplexes a predetermined number of streams in which the null packets with time information have been inserted by the one or more insertion units;

a demultiplexer that demultiplexes the stream multiplexed by the multiplexer into the predetermined number of streams; and one or more output timing adjusting units that adjust a timing to output the null packets with reference to the time information inserted into the null packets.

2. The data processing device according to claim 1, wherein a predetermined number of the output timing adjusting units are provided after the demultiplexer.

3. The data processing device according to claim 1, wherein only one of the output timing adjusting units is provided before the demultiplexer.

4. The data processing device according to claim 1, wherein the insertion units detect packets having information on timing for reproduction included in an original stream, trace back the time axis from the detected packets, and insert the null packets with time information into the nearest empty spaces.

5. The data processing device according to claim 1, further comprising:
a clock generation unit that supplies time information generated with a fixed clock to the insertion units and the output timing adjusting units.

6. A receiving device comprising:
the data processing device according to claim 1;
a demodulation unit that demodulates broadcast waves and acquires the multiplexed stream; and
a decoding unit that decodes video and audio included in output from the output timing adjusting unit.

7. A data processing method comprising the steps of:
generating one service stream of a plurality of service streams by selecting packets configuring the one service stream from a multiplexed stream obtained by multiplexing the plurality of service streams;
inserting null packets with time information, in which predetermined time information has been given to payloads, to spaces that become empty when the one service stream is generated;
multiplexing a predetermined number of streams in which the null packets with time information have been inserted;
demultiplexing the multiplexed stream into the predetermined number of streams; and
adjusting a timing to output the null packets with reference to the time information given to the null packets.

8. A non-transitory computer readable medium storing a program that is executable by a computer to perform operations comprising:
generating one service stream of a plurality of service streams by selecting packets configuring the one service stream from a multiplexed stream obtained by multiplexing the plurality of service streams;
inserting null packets with time information, in which predetermined time information has been given to payloads, to spaces that become empty when the one service stream is generated;
multiplexing a predetermined number of streams in which the null packets with time information have been inserted;
demultiplexing the multiplexed stream into the predetermined number of streams; and
adjusting a timing to output the null packets with reference to the time information given to the null packets.

9. A data processing device comprising:
packet selection circuitry configured to generate one service stream of a plurality of service streams by selecting packets configuring the one service stream from a multiplexed stream obtained by multiplexing the plurality of service streams;
insertion circuitry configured to insert null packets with time information, in which predetermined time information has been given to payloads, to spaces that become empty when the packet selection circuitry generates the one service stream;
a multiplexer that multiplexes a predetermined number of streams in which the null packets with time information have been inserted by the one or more insertion units;
a demultiplexer that demultiplexes the stream multiplexed by the multiplexer into the predetermined number of streams; and
output timing adjusting circuitry configured to adjust a timing to output the null packets with reference to the time information inserted into the null packets.

10. The data processing device according to claim 9, wherein the insertion circuitry detects packets having information on timing for reproduction included in an original stream, trace back the time axis from the detected packets, and insert the null packets with time information into the nearest empty spaces.

11. The data processing device according to claim 9, further comprising:
clock generation circuitry configured to supply time information generated with a fixed clock to the insertion circuitry and the output timing adjusting circuitry.

* * * * *